2,965,504

PROCESS FOR PREPARATION OF REFRACTORY INSULATING BLOCKS

Charles J. Gogek, Belmont, Mass., assignor to Corn Products Company, a corporation of Delaware No Drawing. Filed Apr. 1, 1958, Ser. No. 725,520

5 Claims. (Cl. 106—55)

This invention relates to moisture resistant refractory blocks having high hardness suitable for use in insulating furnaces and to a new process for their manufacture.

Insulating blocks used in furnace linings are preferably resistant to moisture during the cementing operation. A variety of materials is used in their manufacture, e.g., iron oxide, rock wool, asbestos, clay. Starch is generally used as a binder. Bentonite which has excellent binding capacity at high temperatures also may be included. Insulating blocks made according to present methods are not entirely satisfactory in that they are not sufficiently moisture proof and also do not have sufficiently hard surfaces to prevent breakage or chipping. Furthermore, in use they give off considerable amounts of lachrymatory gases when subjected to the high temperatures encountered in industrial heat operations.

I have discovered that greatly improved insulating blocks which are highly moisture resistant can be prepared from refractory materials and a binder consisting essentially of a sugar and a chemical adjunct, and I have also discovered that such blocks possess hardness and resistance to breakage and chipping not found in any commercially available refractory block. It is, therefore, the principal object of this invention to provide refractory blocks possessing these very desirable properties and a process for making them. Other objects will appear hereinafter.

In the following description, by the term "sugar," I mean those mono- and di-saccharides of an aldose or ketose character, or such non-reducing saccharides which may be hydrolyzed under conditions of use herein described to give aldose or ketose saccharides. For example, sucrose, which is a saccharide that hydrolyzes under the conditions herein described, is effective as a component of the described binder and is claimed in this invention.

In carrying out this invention, the sugars falling within the foregoing definition which I prefer to employ are dextrose, sucrose, and fructose, or mixtures thereof, but maltose and lactose are also satisfactory though less practicable from cost considerations. Beet or cane molasses (mother liquor in the manufacture of sucrose) and greens and hydrol (mother liquors in the manufacture of dextrose) may likewise be used satisfactorily in conjunction with the chemical adjuncts hereinafter specified, although it is realized that molasses and hydrol are not as easily handled due to their viscous nature as the sugars aforementioned. Syrups which may be made by hydrolysis of starch or from cane sugar by appropriate treatments are also effective in carrying out this invention. Greens or hydrol may be boiled with acid or alkali, in accordance with known methods, to prevent crystallization of the dextrose contained therein. The amount of total binder, i.e., the sugar and adjunct mixture, in the formulation may vary from about 0.5 to 6 parts for 100 parts of the refractory material, on a dry basis. The amount of adjunct in the total binder may range from 1 to 15 percent, dry basis.

The preferred chemical adjunct is ammonium sulfate, but sulfuric acid and salts, such as ammonium bisulfate, alums, e.g., ammonium aluminum sulfate, which produce sulfuric acid under the conditions of use, may also be used.

The invention will be further illustrated by the examples set forth below which are intended for illustrative and informative purposes and not in any way limiting the invention.

Example 1

The following formulation was used:

| | Parts by weight |
|---|---|
| Rock wool | 90 |
| Asbestos fines | 3 |
| Bentonite | 3 |
| Dextrose hydrate | 2.82 |
| Ammonium sulfate | 0.18 |
| Iron oxide | 1 |

In making the insulating block, all of the above-named components were slurried in 600 to 1000 parts of water. The slurry was passed between two moving perforated belts to squeeze out the excess water and compact the undissolved ingredients. The compressed mass was cut into blocks of the desired size. The blocks, still containing substantial amounts of moisture, e.g., as much as 75 percent, were then baked in kilns at 300° F. to 500° F. The press water was recirculated for subsequent use and the sugar and adjunct therein was replenished in amounts calculated to give the proper percentage in the finished block.

Blocks made according to the above information were considerably more resistant to water than blocks made according to prior art methods. The latter, when soaked in water, fell apart in 2 hours or less while those made in accordance with the foregoing example held up for 24 hours. This is an unexpected result and an advantage over previously available blocks.

The blocks made in accordance with the method above described also exhibited a higher surface hardness than those previously available, i.e., no chipping of corners was noted after shipment whereas previously available blocks frequently could not meet this test.

In a use test, the blocks made according to the above example liberated a negligible amount of smoke when subjected to a temperature of 1400° F. whereas similar blocks prepared by prior art methods smoked copiously under the same conditions.

Example 2

A refractory block possessing high moisture resistance and hardness was prepared according to the method set forth in detail in Example 1, employing, however, the following composition.

| | Parts by weight |
|---|---|
| Rock wool | 90 |
| Asbestos fines | 3 |
| Bentonite | 3 |
| Sucrose | 3 |
| Ammonium sulfate | 0.2 |
| Iron oxide | 1 |

Example 3

A refractory block possessing similar properties to those of Examples 1 and 2 was prepared according to the method of Example 1 employing, however, the following composition.

| | Parts by weight |
|---|---|
| Rock wool | 100 |
| Asbestos fines | 3 |
| Bentonite | 3 |
| Molasses | 6 |
| Ammonium sulfate | 0.8 |
| Iron oxide | 1 |

Example 4

When hydrol replaced the molasses in Example 3 blocks having essentially the same properties as those from the previous examples were obtained.

This application is a continuation-in-part of application Serial No. 510,584, filed May 23, 1955 now abandoned.

I claim:

1. A method of preparing a refractory insulating block which comprises slurrying 100 parts of refractory materials consisting essentially of rock wool and a sugar-ammonium sulfate binder, in about 600 to 1000 parts of water, filtering the slurry and shaping the solid material into block form and baking the same at about 300° F. to about 500° F.; the amount of sugar-ammonium sulfate binder being sufficient to provide 0.5 to 6 parts of binder, dry basis, in the filtered block; the amount of ammonium sulfate in the sugar-ammonium sulfate binder being 1 to 15 percent, dry basis.

2. A refractory insulating block consisting of a cemented mass obtained by baking 100 parts of refractory materials consisting essentially of rock wool, 0.5 to 6 parts of a sugar-inorganic adjunct binder, dry basis, at a temperature of about 300° F. to 500° F.; said adjunct being present in said binder in the amount of 1 to 15 percent of the binder, dry basis, and being selected from the group consisting of sulfuric acid and salts which produce said acid at temperatures above about 300° F.

3. A process for producing an insulating block which comprises molding into a block a mixture of 100 parts of refractory materials consisting essentially of rock wool, 0.5 to 6 parts of a sugar-inorganic adjunct binder, dry basis, and sufficient water to mold said block and baking the block at a temperature of about 300° F. to 500° F.; said adjunct being present in said binder in the amount of 1 to 15 percent of the binder, dry basis, and being selected from the group consisting of sulfuric acid and salts which produce said acid at temperatures above about 300° F.

4. A refractory insulating block consisting of a cemented mass obtained by baking 100 parts of refractory materials consisting essentially of rock wool and small amounts of asbestos, bentonite and iron oxide, 0.5 to 6 parts of a sugar-inorganic adjunct binder, dry basis, at a temperature of about 300° F. to 500° F.; said adjunct being present in said binder in the amount of 1 to 15 percent of the binder, dry basis, and being selected from the group consisting of sulfuric acid and salts which produce said acid at temperatures above about 300° F.

5. A process for producing an insulating block which comprises molding into a block a mixture of 100 parts of refractory materials consisting essentially of rock wool and small amounts of asbestos, bentonite and iron oxide, 0.5 to 6 parts of a sugar-inorganic adjunct binder, dry basis, and sufficient water to mold said block and baking the block at a temperature of about 300° F. to 500° F.; said adjunct being present in said binder in the amount of 1 to 15 percent of the binder, dry basis, and being selected from the group consisting of sulfuric acid and salts which produce said acid at temperatures above about 300° F.

References Cited in the file of this patent

UNITED STATES PATENTS

| | | |
|---|---|---|
| 287,817 | Frank | Nov. 6, 1883 |
| 1,919,037 | Quigley | July 18, 1933 |

FOREIGN PATENTS

| | | |
|---|---|---|
| 494,717 | Great Britain | Oct. 26, 1938 |